United States Patent

Dallavalle et al.

[11] Patent Number: 4,987,285
[45] Date of Patent: Jan. 22, 1991

[54] PROTECTION CIRCUIT FOR PLASMA-ARC WELDING AND CUTTING EQUIPMENT OPERATED WITH TRANSFERRED OR NON-TRANSFERRED ARC

[75] Inventors: Silvano Dallavalle, Castel S. Pietro; Raffaele Ansaloni, S. Lazzaro di Savena, both of Italy

[73] Assignee: Cebora S. P. A., Bologna, Italy

[21] Appl. No.: 426,731

[22] Filed: Oct. 24, 1989

[30] Foreign Application Priority Data

Nov. 15, 1988 [IT] Italy .................................. 3664 A/88

[51] Int. Cl.$^5$ .............................................. B23K 9/00
[52] U.S. Cl. ............................ 219/121.54; 219/121.57; 219/130.31
[58] Field of Search .................... 219/121.54, 121.56, 219/121.57, 75, 121.48, 124.02, 124.03, 130.31, 130.32, 130.4

[56] References Cited

U.S. PATENT DOCUMENTS

| | | | |
|---|---|---|---|
| 3,558,973 | 11/1968 | Pochert et al. | 219/121.57 |
| 4,156,125 | 5/1979 | Brown | 219/121.57 |
| 4,692,582 | 9/1987 | Marhic | 219/121.57 |
| 4,795,882 | 1/1989 | Hardwick et al. | 219/124.02 |

FOREIGN PATENT DOCUMENTS 3036974  2/1988  Japan ............................. 219/121.57

Primary Examiner—M. H. Paschall
Attorney, Agent, or Firm—Darby & Darby

[57] ABSTRACT

The circuit is designed to protect plasma-arc welding or cutting equipment wired for transferred or non-transferred arc operation, using a torch of which the electrode is connected to the negative terminal of the power source and the nozzle to the positive; the arc can be transferred by wiring the work to the positive terminal also. With voltage between at least two of the three connected parts (electrode, nozzle and work) constantly monitored, filtered, and measured against a set point by a comparator of which the output operates a switch controlling the power supply to the equipment, the power source can be deactivated immediately in the event that the monitored voltage registers less than the set point.

14 Claims, 1 Drawing Sheet

PROTECTION CIRCUIT FOR PLASMA-ARC WELDING AND CUTTING EQUIPMENT OPERATED WITH TRANSFERRED OR NON-TRANSFERRED ARC

BACKGROUND OF THE INVENTION

The present invention relates to a circuit for the protection of plasma-arc welding/cutting equipment operating with transferred or non-transferred arc. The prior art embraces plasma-arc welding systems with torches that comprise a cylindrical electrode, rigidly attached to the body of the torch itself and connected by way of a conductor to the negative terminal of the power source. Such torches further comprise an anode in the form of a cap, mounted in fixed position with respect to the electrode and covering the tip; the cap is insulated from the tip and connected by way of a second conductor to the positive terminal of the power source.

Cap and electrode are positioned in such a way that a thin gap is left between them for admission of the pressurized stream of plasma gas, which emerges ultimately by way of a pin hole in the cap; thus, the cap is known generally as the 'nozzle'. In a first conventional method of using torches of this type, an arc is struck with the assistance of an ultra-high auxiliary voltage, generated in most instances by complicated high frequency circuits with which the torch is connected by long, heavily insulated conductors.

More exactly, a spark is ignited between the nozzle and the electrode, these being fixed in relation to one another, from which the resulting arc remains struck until cut off by operating the torch control button or the main power switch.

In the majority of instances, this non-transferred arc type of operation, so called by reason of the fact that the electric arc remains confined to the torch, is converted to transferred arc operation by connecting the work for welding or cutting to the same positive terminal as that to which the return conductor from the nozzle is connected, and wiring a resistance between the terminal and the return. As the torch is offered to the work, the arc will encounter less resistance from the work than from the return terminal, and accordingly is transferred to the work. The same effect can also be obtained by wiring a switch in place of the resistance, of which the contacts will be broken as welding or cutting commences.

In a second system of cutting or welding by the transferred arc method, the arc is struck between the electrode and the work, the electrode again incorporated fixedly into the torch and connected to the negative terminal of the power source, and the work connected to the positive.

This type of torch has a movable nozzle, and the arc is struck simply by bringing about a momentary contact of the nozzle with the electrode on the one hand and the work (which is grounded) on the other. The effect of contact and immediate release is to bring about an instantaneous short circuit of the welding current as the electrode, nozzle and work are bridged, whereupon an arc is struck across the gap which opens up as the nozzle is distanced from the electrode, and transferred immediately from the electrode to the work.

Needless to say, if an arc is to be struck and held between the two elements of the torch, a singularly high potential difference must exist between the two.

Conventionally, plasma-arc torches of the type in question comprise an electrode that consists of a copper holder, and a central insert from which the arc is effectively struck; accordingly, the insert is fashioned in material possessing particularly good resistance to heat, for example zirconium and hafnium, and will thus be capable of withstanding high temperatures without sublimating.

As a general rule, the p.d. needed between cathode and anode to sustain an arc, or arc voltage, has been found by experiment to be equivalent to the sum of three distinct voltage drops—i.e. through the cathode, through the anode and through the arc, the drop through the arc being proportionate to the length of the arc itself.

The drop in cathode voltage is by far the greatest, and, being concentrated in the area immediately surrounding the electrode across a singularly short space (of the order of a few $\mu$m), characterized by the presence of a strong electric field, hence by high losses; temperatures thus rise to particularly high values in the area in question, and it is for this reason that the electrode insert is fashioned from a material with a high sublimation point.

Accordingly, during cutting or welding operations, the electrode becomes subject not only to stresses of an electrical nature, but also to marked thermal stresses, hence to wear.

More exactly, as the insert is gradually consumed, the contour of the encompassing copper holder is laid bare, with the result that the copper itself becomes involved, unwarrantably, in generation of the arc.

Being a metal of relatively low melting point, in comparison to that used for the insert and found thus undesirably to be conductive and fuelling the arc, the holder begins to melt and shed molten material; the result is that a crater is formed in the electrode, upsetting its geometry, and one has a steady deterioration comparable in its effect to that of an avalanche.

Deformation of the electrode continues, and the characteristics of the plasma envelope are modified to the extent that the encompassed arc becomes destructive.

In particular, the voltage generated between the electrode and the nozzle of a plasma-arc cutting or welding torch, both on striking the arc and holding it thereafter during operation, depends solely upon the distance by which the two parts are separated; thus, a variation in this distance, or gap, will produce a corresponding rise or fall in voltage. In practice, factors which tend to alter the gap between electrode and nozzle include the effects of impurities in the air fed into the plasma stream, of the particles of molten metal that separate from the electrode and carry into the plasma envelope, and of wear on the electrode.

More exactly, continual melting and dispersion of the electrode copper can lead ultimately to the formation of a bridge between electrode and nozzle, the effect of which is to short-circuit the two components and produce a collapse in the voltage level, which gravitates swiftly towards zero. In a situation such as this, both the torch and the equipment power source can become severely damaged.

Accordingly, it is most important to be able to monitor the state of wear of the insert, hence of the entire electrode, to the end of preventing the deterioration described above and avoiding its attendant drawbacks.

The object of the present invention is to provide a protective circuit applicable to plasma-arc torches of the type in question and capable of overcoming the difficulties aforementioned.

SUMMARY OF THE INVENTION

The stated object is realized by adoption of a circuit according to the invention.

Such a circuit is designed to monitor and measure a quantity proportional to the potential difference by which the arc is maintained, to compare it with a given set point, and to isolate the power source of the equipment from the electrical power supply whenever disturbances in the monitored quantity are such as to indicate excessive and abnormal wear on the electrode produced by an excessive and abnormal accumulation of molten metal particles internally of the plasma envelope.

One of the advantages obtained with the present invention is that it enables the operator to take early corrective action in respect of a damaged electrode, inasmuch as replacement can be effected before extensive sublimation of the metal causes damage to the torch as a whole.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
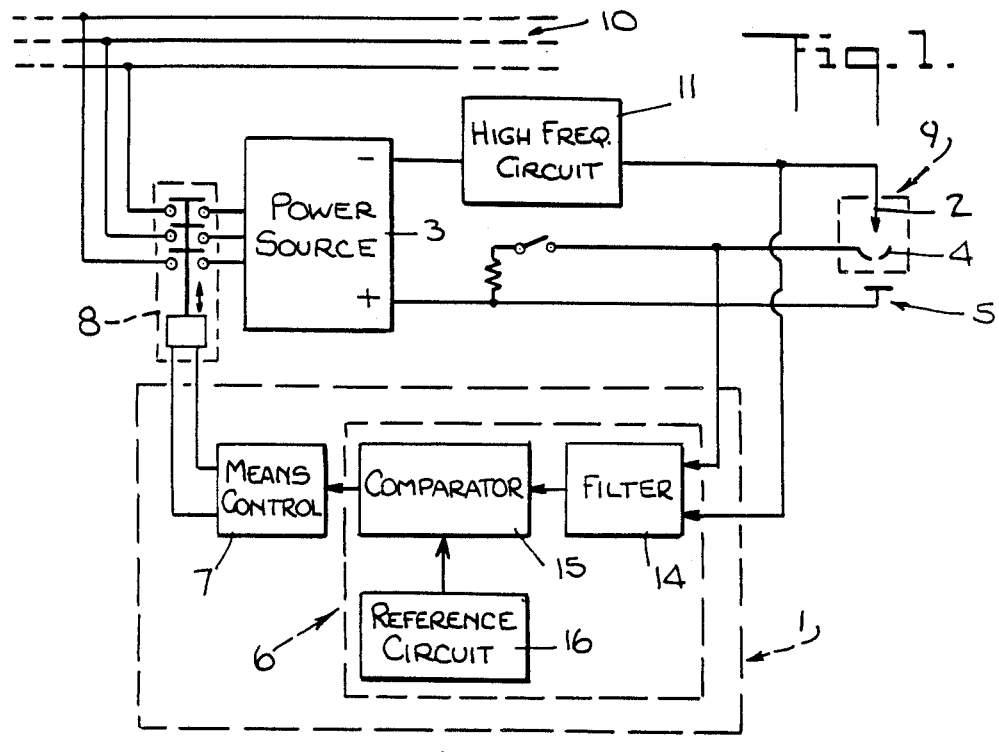
FIG. 1 is a block diagram of the protective circuit according to the invention.

With reference to the accompanying drawings, the block illustrated in phantom line and numbered 9 denotes a plasma-arc torch, consisting essentially in a first element, or electrode 2 connected to the negative terminal of a rectifier or power source 3, and a second element, or nozzle 4, connected to the positive terminal of the power source 3.

5 indicates a third element, and more exactly, a piece of work to be cut or welded which, in the case of transferred-arc operation, for example, can be connected to the positive terminal of the power source 3.

10 denotes the electrical power supply line to the source 3, which is controlled by a switch 8. The torch can be utilized for welding and cutting operations with a transferred or non-transferred arc, according to whether or not the work 5 is connected to the positive terminal of the power source 3.

In operation, a potential difference is generated by the power source 3 between the electrode 2 and the nozzle 4, such as will sustain an electric arc; in the embodiment of FIG. 1, the arc is struck by applying a particularly high auxiliary voltage supplied from a high frequency circuit 11 connected to the electrode 2.

Conventionally, the nozzle 4 can be also be made capable of movement in relation to the electrode 2 between two limit positions, namely, contact and release.

The protection circuit according to the invention, denoted 1 in its entirety, comprises means by which to monitor, measure and then compare a quantity proportional to the potential difference generated between the electrode 2 and nozzle 4, and control means 7 to which the power supply switch 8 is interlocked.

More exactly, the quantity monitored, measured and compared is in fact the voltage generated between the electrode 2 and the nozzle 4 of the torch. The monitoring, measuring and comparing means 6 in question are provided with inputs connected to the elements of the torch 9, and comprise: a filter 14, wired to the electrode 2 and the nozzle 4, by which the more rapid and smaller amplitude variations in the monitored voltage are eliminated or integrated in such a way as to obtain a substantially steady output; a comparator 15, of which the first input is connected to the filter output, the second input to a sample voltage, and the output cascaded into the means 7 which control the switch 8 installed on the power line 10; and a reference circuit 16 by which the sample voltage is generated.

The switch 8 might be electrically operated, as in the illustration of FIG. 1.

Thus, on reception by the means, and more exactly by the comparator 15, of a voltage level between electrode 2 and nozzle 4 lower than that of a set point established previously and supplied by the reference circuit 16, a signal will be relayed to the control means 7 that causes the switch 8 to open, thereby isolating the power source 3 from the line 10.

Figure 2:
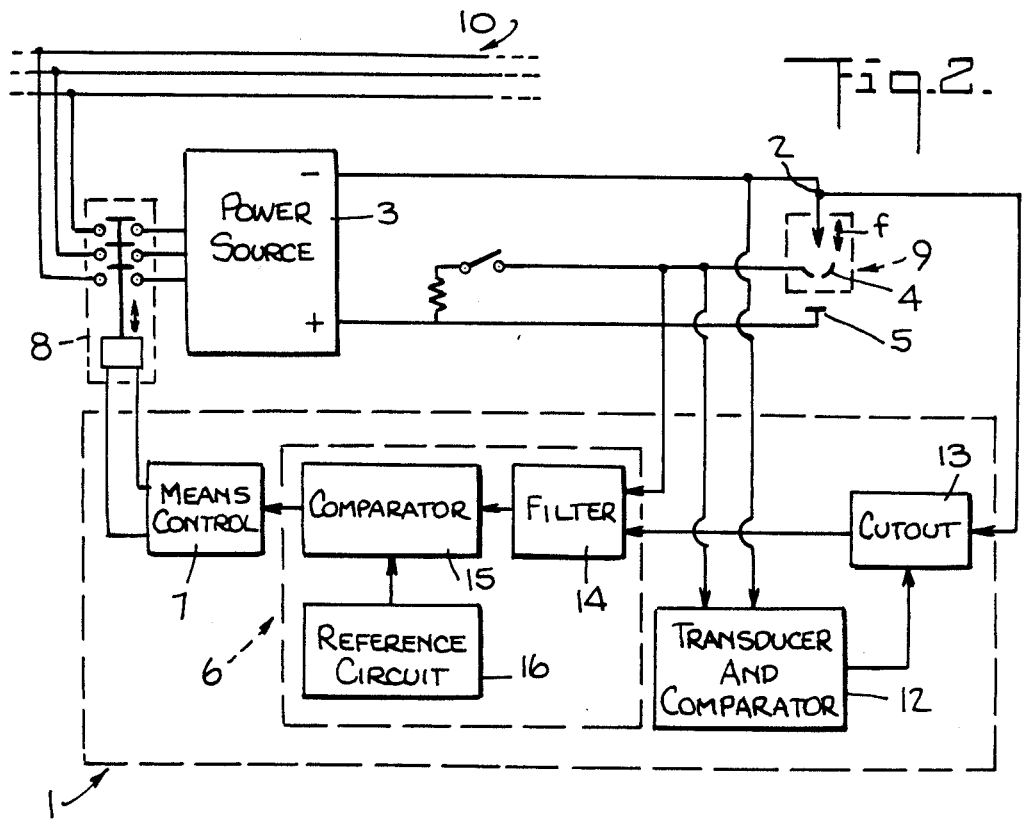
FIG. 2 is the block diagram of a further embodiment of the circuit in FIG. 1.

At this juncture, the torch 9 can be inspected and serviced to the end of restoring normal operation. In the event that the plasma-arc welding or cutting equipment is operated in the transferred-arc mode utilizing a torch of which the nozzle 4 is movable in relation to the electrode 2, and striking an arc by bringing about momentary contact between the nozzle 4 and the electrode 2 (see arrow f, FIG. 2), the potential difference when in the contact limit position becomes practically zero; accordingly, the equipment will further comprise means 12 and 13 by which the protection circuit 1 is deactivated as the electrode 2 and nozzle 4 are drawn into mutual contact, in order that the arc can be struck.

The means in question comprise a transducer-and-comparator 12 of which the inputs are connected to the electrode 2 and the nozzle 4, whilst the output drives a cutout 13 connected in series, for example with and between the electrode 2 and the protection circuit 1.

The transducer-comparator 12 monitors and verifies the arc voltage level both during the weld or cut, and during the approach of the nozzle 4 toward the electrode 2 when the arc is struck, triggering the cutout 13 in the latter instance; thus, operation of the circuit 1 is enabled as long as a steady arc voltage continues to register, and inhibited only at the moment when the arc is struck.

What is claimed:

1. A protection circuit for plasma-arc welding and cutting equipment operating with transferred or non-transferred arc, comprising:
   a rectified power source capable of generating a potential difference between separately connected elements such as will sustain in electric arc;
   a torch, of which a first element, or electrode, is connected by an electrical conductor to the negative terminal of the power source, and a second element, or nozzle, is connected by an electrical conductor to the positive terminal of the power source;
   a further electrical conductor by which a third element, or workpiece, is connected to the positive terminal of the power source in such a way that the arc can be transferred to the workpiece during welding or cutting operations;
   means by which to monitor and measure a quantity proportional to the potential difference between said first element and one of said second and third elements and to effect a comparison with a set point, and in the event that the quantity registering is less than the set point, to pilot control means capable of isolating the power source from an electrical power supply, whereby said quantity registers less than the set point when the electrode is in a condition which arises when the electrode has excessive and abnormal wear which will eventually lead to damage to the torch as a whole if the electric arc is continued to be sustained.

2. A circuit as in claim 1, wherein the inputs of the monitoring, measuring and comparing means are electrically connected to the electrode and to the nozzle of the torch.

3. A circuit as in claim 1, wherein the quantity monitored, measured and compared is one and the same as the potential difference existing between the two elements with which the monitoring, measuring and comparing means are connected.

4. A circuit as in claim 1, wherein the output of the control means pilots the excitation circuit of an electrically operated switch connected in series with the power supply line to the power source.

5. A circuit as in claim 1 for the protection of plasma-arc welding or cutting equipment utilizing a torch designed for transferred-arc operation, of which the nozzle is movable in relation to the electrode and with which an arc is struck by bringing about momentary contact and immediate release between and of the nozzle and electrode, wherein the potential difference between nozzle and electrode registers substantially nil at the moment when contact occurs, further comprising means which are designed to deactivate the protection circuit whenever electrode and nozzle are drawn together and into contact, in order to permit of striking the arc.

6. A circuit as in claim 1, wherein the monitoring, measuring and comparing means comprise:
a filter, wired to the electrode and the nozzle, by which the more rapid and smaller amplitude variations in monitored potential difference are eliminated in such a way as to obtain a substantially steady output;
comparator, of which one input is connected to the filter output, the second input to a sample voltage, and the output cascaded into the control means by which the power source is isolated from the power supply line;
reference circuit capable of generating the sample voltage.

7. A circuit as in claim 5, wherein means for the deactivation of the protection circuit comprise a transducer-comparator the input stage of which is connected to at least two of the first, second or third elements, and the output connected to cutout means installed in series with and between at least one of the first, second or third elements and the protection circuit.

8. A protection circuit for plasma-arc welding and cutting equipment, comprising:
a torch having two elements one of which being an electrode;
means for generating a potential difference between said two elements such as will sustain an electric arc between said two elements;
means for making a comparison between said potential difference and a predetermined set point, said comparison revealing a condition of said electrode, and
means for interrupting generation of said potential difference and thereby stopping sustainment of the electric arc in response to said comparison revealing that the electrode is in the condition which may arise when excessive and abnormal wear on the electrode has taken place so that if the electric arc is allowed to continue to be sustained, damage to the torch as a whole will eventually result.

9. A circuit as in claim 8, further comprising a reference circuit for generating said set point.

10. A circuit as in claim 8, further comprising a filter in electrical connection with said two elements for producing a substantially steady output to said comparing means.

11. A circuit as in claim 8, wherein the other of said two elements is a nozzle.

12. A circuit as in claim 8, wherein generating means is a power source with a positive terminal and a negative terminal, said electrode is in electrical connection with said negative terminal, said other of said elements being a nozzle in electrical connection with said positive terminal, further comprising a workpiece in electrical connection with said positive terminal.

13. A circuit as in claim 8, wherein said interrupting means interrupts generation of said potential difference when said comparison reveals that said potential difference is less than said set point and thereby indicative of the condition of the electrode when excessive and abnormal wear of the electrode has taken place.

14. A circuit as in claim 8, wherein the other of said two elements is a workpiece.

* * * * *